(12) United States Patent
Teferi et al.

(10) Patent No.: US 11,928,065 B2
(45) Date of Patent: Mar. 12, 2024

(54) DIGITAL INTERRUPT MANAGEMENT SYSTEM WITH BIDIRECTIONAL SELECTION LINES

(71) Applicant: STMicroelectronics S.r.l., Agrate Brianza (IT)

(72) Inventors: Eyuel Zewdu Teferi, Milan (IT); Alessandra Maria Rizzo Piazza Roncoroni, Abbiategrasso (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 17/673,677

(22) Filed: Feb. 16, 2022

(65) Prior Publication Data

US 2022/0269627 A1   Aug. 25, 2022

(30) Foreign Application Priority Data

Feb. 25, 2021   (IT) .......................... 102021000004475

(51) Int. Cl.
*G06F 13/362*   (2006.01)
*G06F 1/12*   (2006.01)

(52) U.S. Cl.
CPC .............. *G06F 13/362* (2013.01); *G06F 1/12* (2013.01)

(58) Field of Classification Search
CPC ............. G06F 13/4282; G06F 13/4291; G06F 13/362; G06F 13/24; G06F 13/42; G06F 13/32; G06F 13/36; G06F 1/12
See application file for complete search history.

(56) References Cited

U.S. PATENT DOCUMENTS

| | | | |
|---|---|---|---|
| 2002/0188782 A1* | 12/2002 | Fay ...................... | G06F 13/4291 710/110 |
| 2007/0186021 A1* | 8/2007 | Drexler ................... | G06F 13/24 710/110 |
| 2012/0072628 A1* | 3/2012 | Crockett ............. | G06F 13/4291 710/110 |
| 2013/0297829 A1* | 11/2013 | Berenbaum ......... | G06F 13/4256 710/36 |
| 2015/0227480 A1 | 8/2015 | Whitaker et al. | |
| 2019/0012291 A1* | 1/2019 | Biniguer ............. | G06F 13/4291 |
| 2022/0358077 A1* | 11/2022 | Jansen .................. | G06F 13/374 |
| 2023/0083877 A1* | 3/2023 | Mishra .................... | G06F 13/32 710/110 |

FOREIGN PATENT DOCUMENTS

EP              3001323  A1     3/2016

* cited by examiner

*Primary Examiner* — Raymond N Phan
(74) *Attorney, Agent, or Firm* — Seed IP Law Group LLP

(57) ABSTRACT

In a digital communication system, a master device and a number of slave devices are coupled in communication with the master device over a shared data communication bus. A selection line for each one of the slave devices couples the master device with a respective slave device and is dedicated to selection by the master device of the respective slave device for communication over the shared data communication bus. Each of the slave devices is able to send an interrupt request to the master device over the respective selection line to be served by the master device initiating a communication over the shared data communication bus, each selection line thereby being a bidirectional communication line between the respective slave device and the master device.

17 Claims, 5 Drawing Sheets

DIGITAL INTERRUPT MANAGEMENT SYSTEM WITH BIDIRECTIONAL SELECTION LINES

BACKGROUND

Technical Field

The present disclosure relates to an interrupt management system and method in a digital communication interface, in particular a serial interface, more in particular according to the Serial Peripheral Interface (SPI) protocol.

Description of the Related Art

Digital communication interfaces are commonly used, for example in embedded systems, to implement a digital communication between a master or host device (e.g., a digital processor or controller) and a number of slave devices (e.g., sensor devices) coupled to a same bus or digital communication line and which may individually be addressed by the master device.

In a known manner, efficient interrupt management is a difficult task to achieve in commonly implemented digital communication interfaces.

Indeed, most of existing interface protocols require or should otherwise provide a way to send an interrupt from slave devices to the master device in order to receive immediate attention of the master device, but generally entail problems associated either with the requirement or desire of additional dedicated interrupt pins, or with a latency due to waiting for a proper time for the interrupt request (without generating conflicts between different requests or with normal data communication) or due to polling of interrupts; moreover, some solutions cannot be used when multiple devices are sharing the same bus.

For example, in a digital system 1 according to the known SPI protocol, as shown in FIG. 1, a master (or host) device 2 communicates with a number (in the example five) of slave devices 3 over a bus 4 including four communication lines, of which three lines are shared, SCK (carrying a clock signal for synchronization), MOSI—Master Out Slave In (for data communication from master to slave, being denoted as SDI at the slave side) and MISO—Master In Slave Out (for data communication from slave to master, being denoted as SDO at the slave side), and one line is dedicated to each slave device, CS—Chip Select (or SS—Slave Select), in the example denoted with CS0-CS4.

Coupling between the master device 2 and the slave devices 3 further includes a dedicated interrupt line (INT) per each slave device 3 (in the example denoted with INT0-INT4), for a unidirectional communication of interrupt requests from the slave devices 3 to the master device 2.

In a known manner, which is not detailed herein, the master device 2 uses the CS line, which is a unidirectional communication from the master device 2 to the respective slave device 3, to select the corresponding slave device 3 with which implementing a communication using the common SCK, MISO and MOSI data communication lines.

A slave device 3 is able to send an interrupt request in the form of a handshake using the respective interrupt line INT; the master device 2 is then able to serve the interrupt request, answering (acknowledge, ACK) or rejecting (not acknowledge, NACK) the same interrupt request.

In this solution (and in similar solutions requiring or otherwise utilizing additional and dedicated wires to manage interrupt requests from slave devices, such as the I2C—Inter Integrated Circuit interface), a known problem is due to the high number of pins (at the slave and master devices) and wires required or otherwise utilized for communication, with the associated area occupation and routing issues.

For example, if a master device is connected by means of a SPI bus to four slave devices, the bus will include the three shared data communication lines (SCK, MOSI, MISO), four CS lines or wires and four additional interrupt lines (one from each of the slave devices), thus bringing the total number of lines and corresponding PCB (Printed Circuit Board) traces to eleven.

In general, the number of wires required or otherwise utilized for a number N of slave devices connected on a SPI bus to a master device is given by 3+2N (three communication lines and a respective number N of dedicated chip select and interrupt lines).

It is therefore clear that area occupation and wiring complexity and routing may become a relevant issue for embedded system envisaging a large number of connected devices, such as modern MEMS (Micro Electro Mechanical) embedded systems.

Other known digital communication interfaces, such as according to the I3C protocol, do not envisage use of a dedicated interrupt line for each slave device (e.g., for each sensor device), instead using the same data communication lines for an interrupt request. In particular, in the I3C protocol, only two lines are used for connection between the various slave devices sharing the same serial data bus, one line (SCL) being used to carry a clock signal to define the sampling times and the other line (SDA) being used as a bidirectional data line and, in a shared manner, also for interrupt requests.

This solution for interrupt management is generally known as IBI, i.e., In-Band Interrupt, since interrupt requests are communicated over the same data line (therefore using the same bandwidth and resources as the data being communicated), without requiring or otherwise utilizing any additional pin or line for interrupt management.

In a known manner, a drawback of this kind of solution is, however, an increased bandwidth congestion and a delayed interrupt request, due to the need or desirability of a proper management of any possible conflict between interrupt requests and the data being communicated.

BRIEF SUMMARY

Various embodiments of the present disclosure provide a more efficient interrupt management solution in a digital communication interface, which does not require or otherwise utilize an increased area occupation and generally does not entail a relevant increase in the latency in serving (acknowledging or not acknowledging) the interrupt requests.

According to the present disclosure, a system and a method for interrupt management in a digital communication interface are consequently provided.

In at least one embodiment, a digital communication system is provided that includes a master device and a plurality of slave devices communicatively coupled with the master device over a shared data communication bus. A plurality of selection lines are included, and each selection line of the plurality of selection lines couples the master device with a respective slave device and is dedicated to selection by the master device of the respective slave device for communication over the shared data communication bus. Each of the slave devices is configured to send an interrupt request to the master device over the respective selection line, with the master device being configured to serve the interrupt request by initiating a communication over the shared data communication bus. Each selection line is a bidirectional communication line between the respective slave device and the master device.

In at least one embodiment, a method for interrupt management in a digital communication system is provided. The digital communication system includes a master device and a plurality of slave devices communicatively coupled with the master device over a shared data communication bus, wherein the digital communication system includes a respective selection line for each one of the slave devices, coupling the master device with a respective slave device and dedicated to selection by the master device of the respective slave device for communication over the shared data communication bus. The method includes: sending, by each of the slave devices, an interrupt request to the master device over the respective selection line; and serving, by the master device, the interrupt request initiating a communication over the shared data communication bus, wherein each selection line is a bidirectional communication line between the respective slave device and the master device.

BRIEF DESCRIPTION OF THE SEVERAL VIEWS OF THE DRAWINGS

For a better understanding of the present disclosure, preferred embodiments thereof are now described, purely by way of non-limiting example and with reference to the attached drawings, wherein.

DETAILED DESCRIPTION

As will be discussed in detail in the following, the present solution envisages an in-band management of interrupt requests generated by slave devices, which are communicated to a master device using a data communication line (i.e., without requiring or otherwise relying on use of an additional interrupt line).

In particular, according to an aspect of the present solution, a slave-device selection line (e.g., the CS—Chip Select—line) is used for sending interrupt requests from a slave device to the master device. It is underlined that the CS line (or SS line or similar) is a communication line coupling the master device to each slave device, in a dedicated manner, and is normally used by the master device to select the corresponding slave device with which to establish a data communication.

According to an aspect of the present solution, the CS line is not only used as a slave-device selection line driven by the master device, but also as an interrupt request line, driven in this case by the respective slave device to send an interrupt request to the master device.

The CS line is therefore in this case a bidirectional communication line coupling the master device to each slave device, being dedicated to the respective slave device.

In a possible solution, each slave device is coupled to the CS line in an open-drain connection, with the possibility to bring the same CS line to ground (or other reference potential) against an external pull-up (that is usually responsible for keeping the line in a high or idle state).

Usually, the CS line is usually kept at the high state unless the master device wants to initiate a communication, the master thereby bringing the line to ground. According to an aspect of the present solution, each slave device is therefore also able to put the CS line to ground in order to generate an interrupt request to be served (being acknowledged or not) by the master device.

According to a further aspect of the present solution, a proper timing and management of the interrupt requests on the shared CS line is moreover proposed, in order to achieve an effective in-band interrupt management that allows multiple devices to send interrupts even at a same time without creating contention on the bus.

Figure 1:
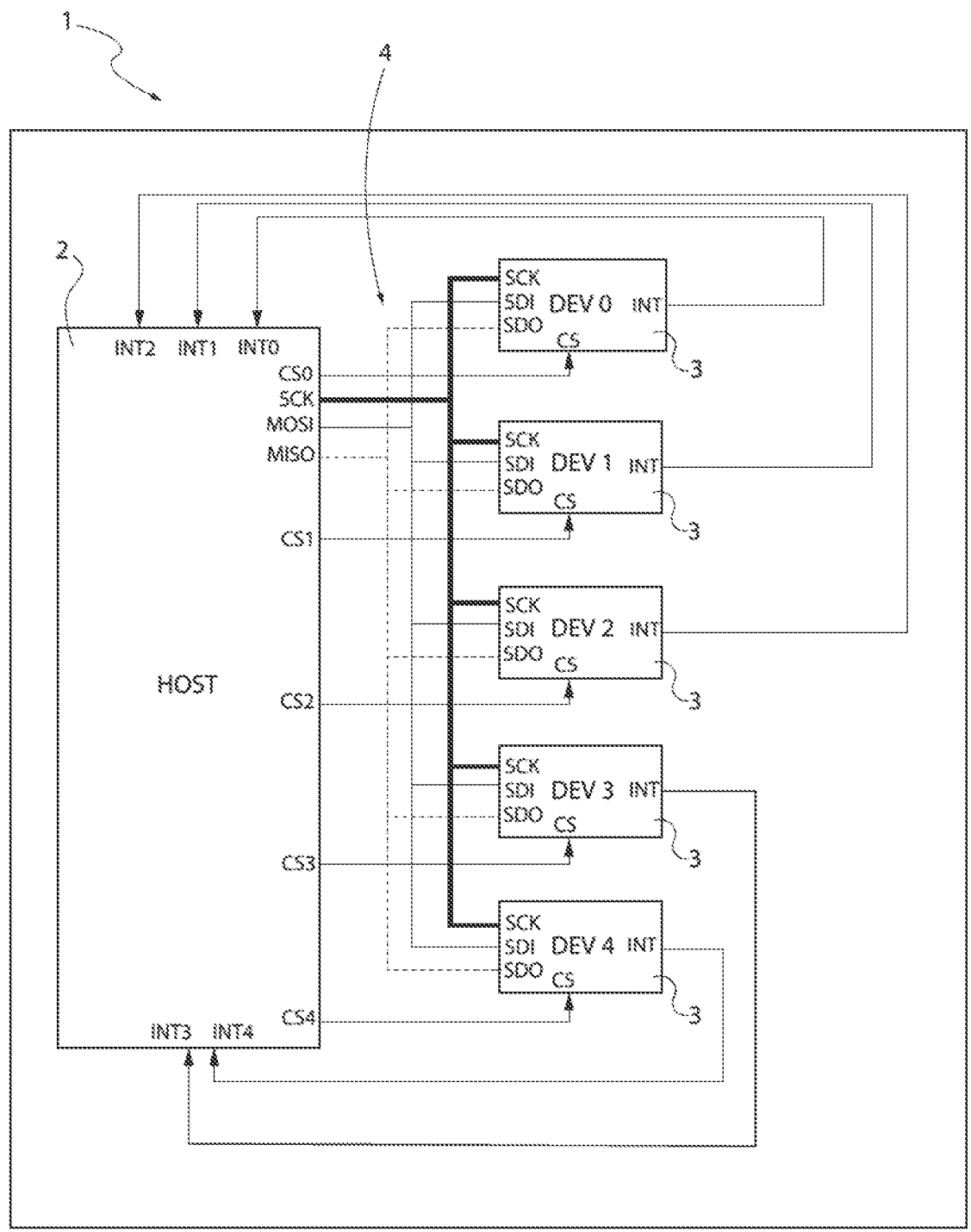
FIG. 1 shows a schematic block diagram of a known digital communication system, with management of interrupt requests in a SPI interface.
Figure 2:
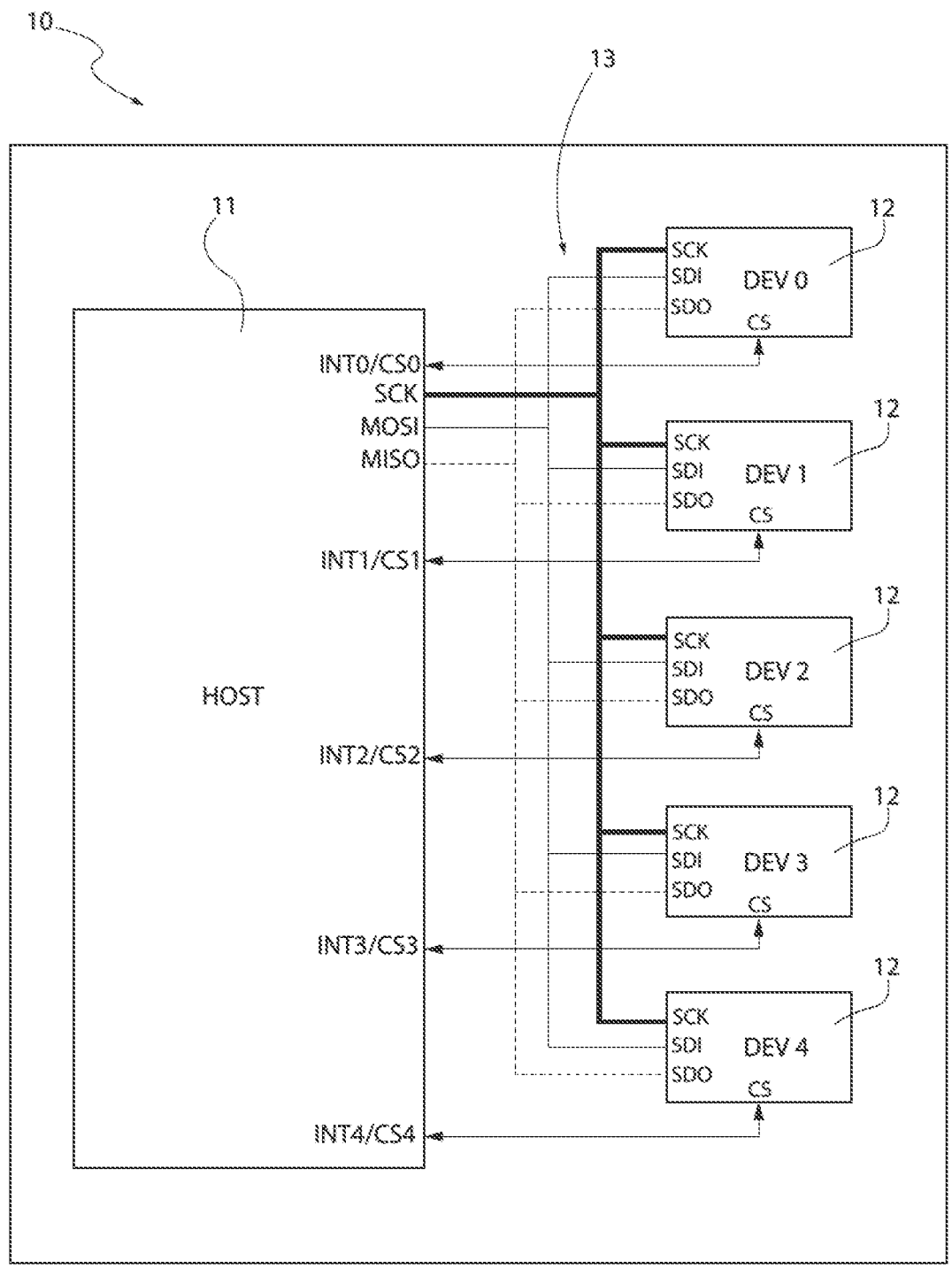
FIG. 2 shows a schematic block diagram of a digital communication system according to an aspect of the present solution.

FIG. 2 shows a digital system 10, according to a possible embodiment of the present solution. A master (or host) device 11 communicates with a number (in the example five) of slave devices 12 over a bus 13 including four data communication lines, of which three lines are shared, SCK (carrying a clock signal for synchronization), MOSI—Master Out Slave In (for data communication from master to slave) and MISO—Master In Slave Out (for data communication from slave to master), and one line is dedicated to selection of each slave device 12, CS—Chip Select (or SS—Slave Select), in the example denoted with CS0-CS4.

As discussed above, according to a particular aspect of the present solution, each CS line implements a bidirectional communication between the respective slave device 12 and the master device 11. It is underlined that the bus 13 does not include, in this solution, one or more additional interrupt lines dedicated to interrupt requests generated from the slave devices 12.

Figure 3A:
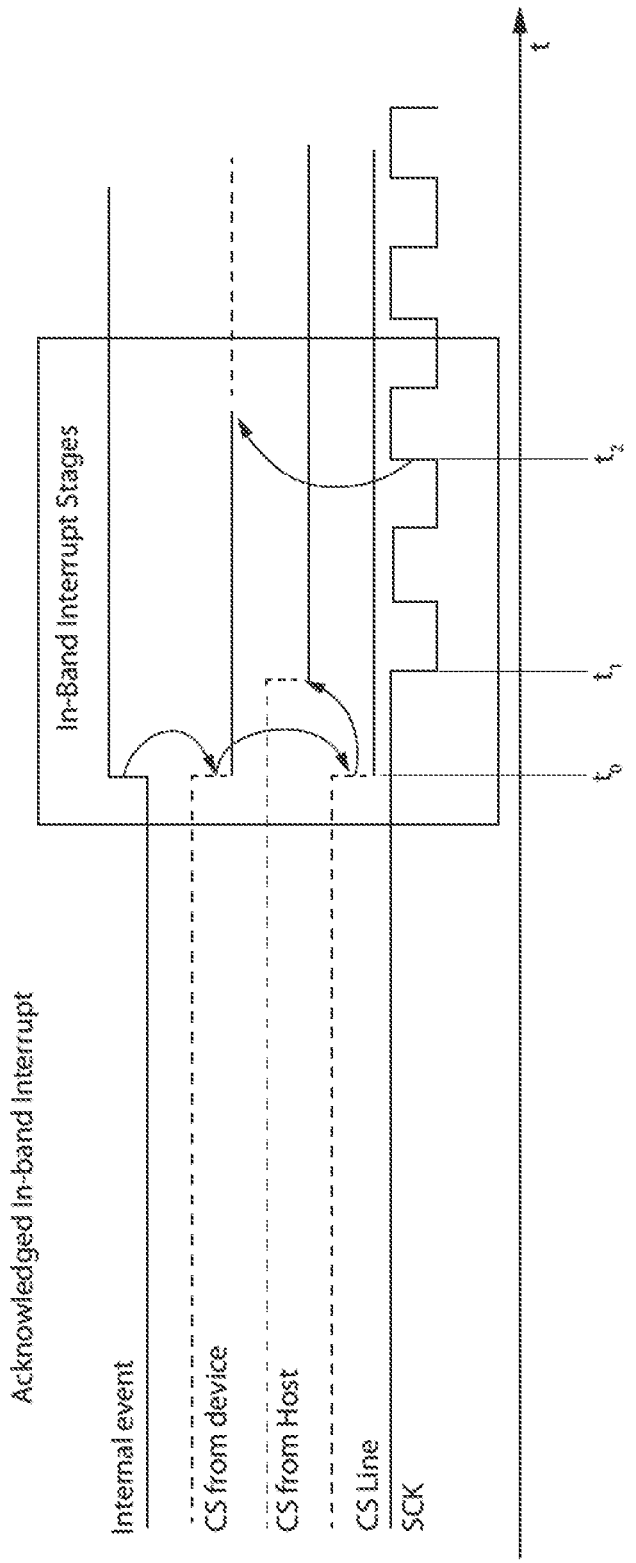
FIGS. 3A and 3B are diagrams of signals related to in-band interrupt management in the digital communication system of FIG. 2.

Reference is now made to FIG. 3A, which relates to the acknowledgement by the master device 11 of an in-band interrupt request initiated and sent by one of the slave devices 12 coupled to the shared bus 13.

In detail, an internal (interrupt) event, occurring at time t0 in one of the slave devices 12 (e.g., detection of a particular condition or state), triggers the same slave device 12 to pull down the CS line (at the side of, or as seen from, the slave device 12), so as to send an interrupt request to the master device 11.

Pulling down of the CS line is seen by the master device 11, which in turn pulls down the CS line (at the side of, or as seen from, the same master device 11), at time t1 (subsequent to time t0), so as to match the device request and start communication with the same slave device 12.

At the same time t1, the master device 11 moreover provides a clock on the SCK line to be used as mutually recognized event on the bus 13, for achieving synchronization between the same master device 11 and the slave device 12. It is noted that the SCK line is shared and seen by all slave devices 12 on the same bus 13, even if communication occurs with another device, this avoiding prolonged pulling down of the CS line (as also discussed in detail in the following).

The slave device 12 then releases the CS line at time t2, after a certain number of periods or cycles of the clock signal, the number being sufficient to guarantee synchronization and at the same time being not too long to avoid excessive delays and/or avoid wrong data communication when the request is not acknowledged and the clock on the SCK line is coming from a communication with another slave device.

In a possible solution, the time interval between times t1 and t2 (where t2 is defined by a mutually identifiable SCK clock edge) is comprised between two and eight clock cycles; for example, as shown in the same FIG. 2A, the slave device 12 may release the CS line after two rising edges of the clock signal.

At time t2, the handover from slave device 12 to master device 11 is completed.

Afterwards, in this case of acknowledgment by the master device 11 of the interrupt request, the same master device 11 keeps driving low the CS line, for the time required or desired to complete the data communication with the slave device 12 using the established communication channel (data communication being implemented in a known manner, here not detailed).

Figure 3B:
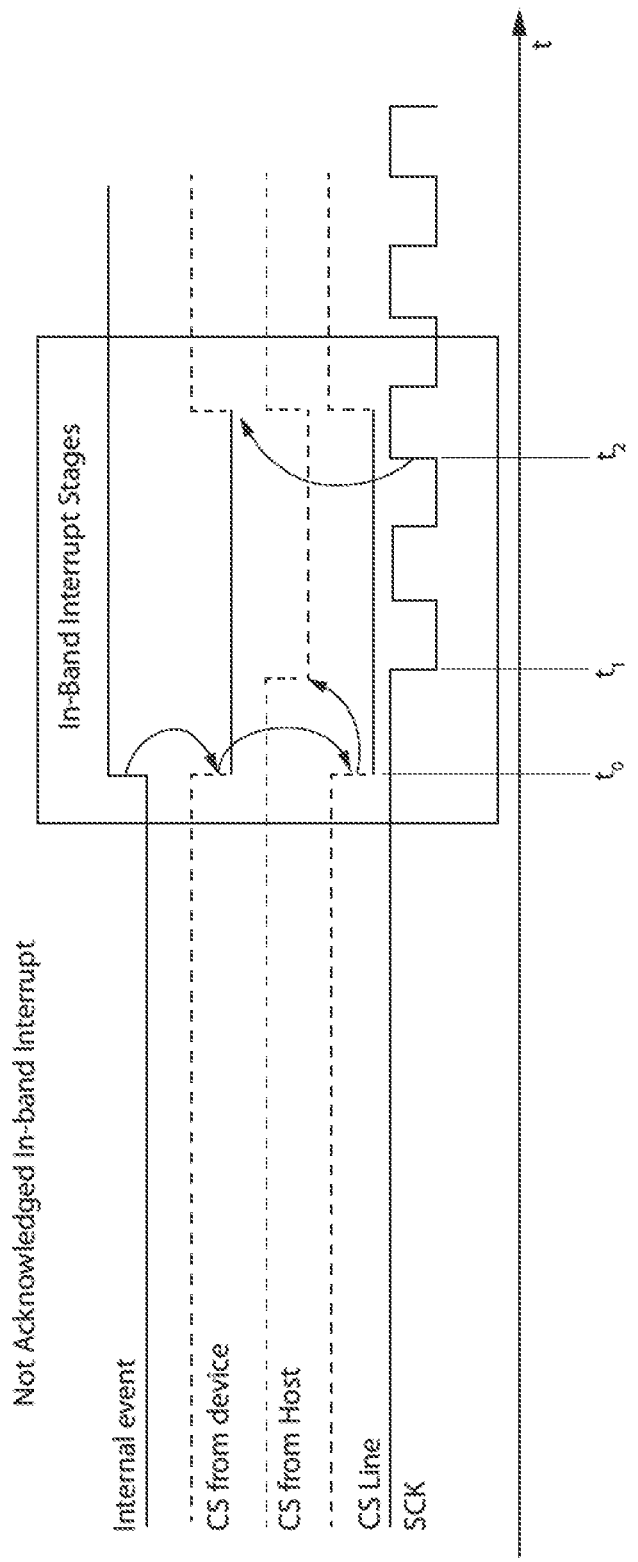

With reference to FIG. 3B, the stages of a not-acknowledged in-band interrupt request are now discussed.

As previously shown, an internal event triggers at time t0 a slave device 12 to pull down the CS line, so as to send an interrupt request to the master device 11.

Pulling down of the CS line is seen by the same master device 11, which in this case of not-acknowledgment of the interrupt request, records but rejects the request, e.g., due to an on-going previous communication with another device on the shared bus 13 (as shown by the dashed line, the master device 11 in this case does not actively drive the CS line).

The slave device 12 then releases the CS line at time t2, after the pre-set number of clocks, e.g., after two rising edges of the clock signal, thus completing the handover from slave device 12 to master device 11.

Since the master device 11 in this case is not driving the CS line from his side, the same CS line subsequently returns to the high (or idle) state; the opened channel for communication between the slave device 12 and the master device 11 is thus closed.

Figure 4:
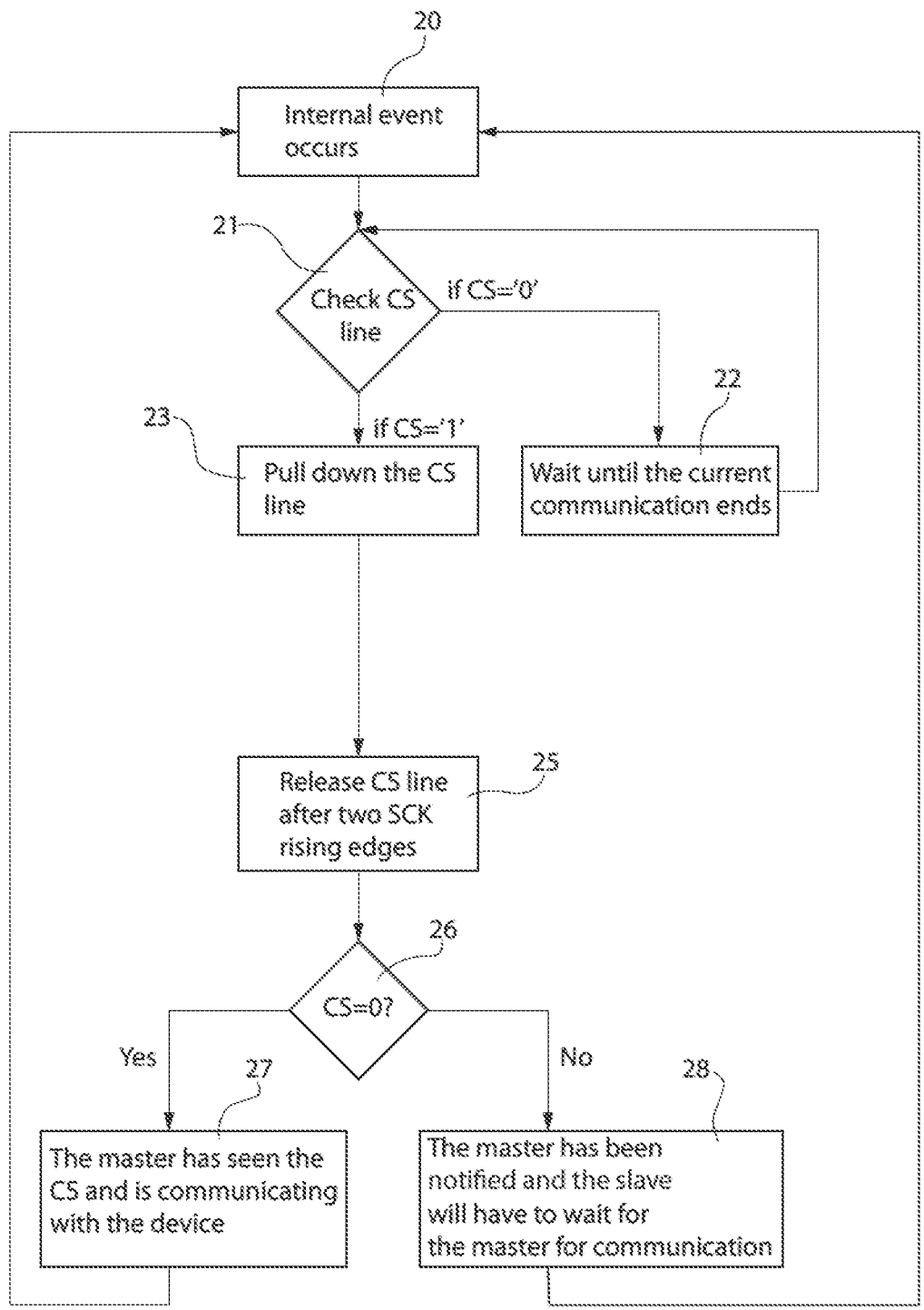
FIG. 4 is a flow chart of in-band interrupt management operations in the digital communication system of FIG. 2.

The interrupt management method according to an aspect of the present solution is now further discussed with reference to the flowchart of FIG. 4, which particularly relates to the interrupt management operations performed at the side of a slave device 12 generating an interrupt request.

As indicated at step 20, an internal event occurs at one of the slave device 12 sharing the same bus 13; for example, for a sensor device, the internal event may correspond to detection of a particular condition or state of an electronic apparatus wherein the digital system 10 including the same slave device 12 and the master device 11 is embedded.

At step 21, the slave device 12 checks the state of the respective dedicated CS line (coupling the same slave device 12 to the master device 11): if the respective CS line is already pulled down (or in a low state, i.e., CS='0'), meaning that a communication with the master device 11 is already in progress, the slave device 12 waits until the same communication ends, as shown at step 22.

If the CS line is instead high or in idle state (i.e., CS='1'), the slave device 12 pulls down the same CS line, for example brings the CS line to ground (in any known manner, e.g., using a controlled transistor in case of an open-drain connection between the same slave device 12 and the master device 11), as shown at step 23.

Pulling down of the CS line is seen by the master device 11, which responds accordingly (in a manner here not shown), in particular acknowledging the interrupt request, in this case pulling down, in turn, the CS line at the side of the same master device 11, or not-acknowledging the interrupt request, in this case leaving the CS line in its current state, in other words passively ignoring the request.

The slave device 12 then keeps the CS line low for the preset number of cycles of the clock signal on the SCK line; for example, the slave device 12 waits until the second rising edge of the clock signal on the SCK line and then releases the CS line, as shown at step 25.

The slave device 12 then checks, at step 26, the state of the CS line.

If the CS line is low, as shown at step 27, it means that the master device 11 has acknowledged the interrupt request and is communicating with the slave device 12 (e.g., driving the SCK and MOSI lines according to the SPI protocol); the slave device 12 will then continue to communicate with the master device 11, in a known manner, not detailed herein (e.g., driving the MISO line according to the SPI protocol).

If the CS line instead goes back to high (after releasing it by the slave device 12), at step 28, it means that the master device 11 has not acknowledged the interrupt request (e.g., because the same master device 11 is currently communicating with another device or has chosen to serve the interrupt request at a later time); in this case, the slave device 12 will have to wait for the master device 11 to initiate communication at a subsequent time.

In a possible embodiment, the slave device 12 will not request for the same interrupt again but will wait for the next new interrupt event to happen, in order to request the attention of the master device 11.

As an alternative, here not discussed in detail, the slave device 12 can be programmed to request attention periodically with further and periodic attention requests (interrupt notifications), for a certain number of iterations or until the interrupt request is served by the master device 11.

The advantages of the solution proposed are clear from the foregoing description.

In any case, it is again underlined that the proposed interrupt management system and method allow to efficiently manage interrupt requests from slave devices coupled to a master device over a shared digital communication line, achieving both a low area consumption and low bandwidth requirements or utilization.

The proposed solution indeed exploits an already existing line used for selection of the respective slave device by the master device, which becomes bi-directional, further allowing the provision of interrupt requests from each slave device to the master device; moreover, the present solution does not interrupt the normal flow of communication between the master and the slave devices. The discussed solution therefore represents a minimally intrusive and easily manageable way of requesting an interrupt by the slave devices coupled to the shared bus.

In particular, as indicated in the previous section, the CS line (or analogous slave-device selection line) is mostly not used and kept at a logic high, until the master device starts a communication. If used as a bidirectional (e.g., an open drain) line, the slave device can use the same CS line (when in the high state) as a way of notifying the master device that an event has occurred internally to which the same master device needs to or should otherwise give immediate attention.

Moreover, the mutually recognizable event used for synchronization provides a low power consumption application by removing the requirement or dependency of timer-based synchronization and allowing multiple devices to request an interrupt at a same time without causing any conflict on the bus.

Use of the present solution in connection with the SPI protocol may be particularly advantageous, allowing to couple the very high speed support of the SPI with a reduced pin (or line) count and a corresponding area occupation reduction.

It is clear that modifications and variations may be made to what has been described and illustrated herein, without thereby departing from the scope of the present disclosure.

In particular, it is again underlined that the present solution may be advantageously implemented also for other digital interface protocols (different from the SPI protocol), provided that they envisage a selection line dedicated to each slave device, allowing to select the same slave device for communication with the master device.

It is also underlined that the solution requires or otherwise utilizes this selection line to operate as a bidirectional communication line between the slave and master devices, without a predefined direction of communication; for example, and as previously discussed, the selection line may be implemented as an open-drain line.

It is also submitted that the master and slave devices may comprise any suitably programmed microcontroller or control unit; in particular, bidirectional CS pins (coupled to the CS line) at the master and slave devices may be implemented by GPIO (General Purpose Input Output) pins, suitably programmed to operate in the bidirectional communication over the CS line (i.e., being configurable and operating either as an input or as an output both at the master and the slave sides).

Moreover, it is noted that, in order to mitigate possible latency issues in the management of the interrupt requests (e.g., when the interrupt request is not immediately acknowledged by the master device, being it already engaged in a previous communication), the present solution may also envisage a further and dedicated attention line shared between all slave devices and the master device; this further attention line may be polled by the master device to determine which device requested the master attention, further improving management of the input requests by the same master device.

A digital communication system (10), may be summarized as including a master device (11) and a number of slave devices (12) coupled in communication with the master device (11) over a shared data communication bus (13), including a selection line (CS) for each one of the slave devices (12), coupling the master device (11) with a respective slave device (12) and dedicated to selection by the master device (11) of the respective slave device (12) for communication over the shared data communication bus (13), characterized in that each of the slave devices (12) is configured to send an interrupt request (INT) to the master device (11) over the respective selection line (CS), the master device (11) being configured to serve the interrupt request by initiating a communication over the shared data communication bus (13), wherein each selection line (CS) is a bidirectional communication line between the respective slave device (12) and the master device (11).

The selection line (CS) may be in a first state when no communication occurs between the master device (11) and the respective slave device (12), wherein the slave device (12) is configured to drive the respective selection line (CS) into a second state, different from the first state, to communicate the interrupt request to the master device (11).

The slave device (12) may be configured to release the selection line (CS), after driving it to the second state, after a given time interval.

The shared data communication bus (13) may include a clock line (SCK) designed to carry a synchronization signal; and wherein the given time interval corresponds to a number of periods of the synchronization signal.

The number of periods may be included between two and eight.

After the given time interval, the slave device (12) may be configured to check the state of the respective selection line (CS) and is further configured to: implement a data communication with the master device (11) in case the respective selection line (CS) remains in the second state, being indicative of acknowledgement of the interrupt request by the master device (11), the master device (11) being configured to drive the selection line (CS) in the second state during the data communication; and wait for a future data communication with the master device (11) in case the respective selection line (CS) is in the first state, being indicative of not-acknowledgement of the interrupt request by the master device (11).

The slave device (12) may be configured to send the interrupt request in response to an internal event occurring at the slave device (12).

The slave device (11) may be configured to check the status of the respective selection line (CS) after the internal event and generate the interrupt request (INT) only in case the respective selection line (CS) is not already in the second state, being indicative of an on-going communication with the master device (11).

Communication on the shared data communication bus (13) may be according to the SPI—Serial Peripheral Interface—protocol and the shared data communication bus (13) may include four data communication lines, of which three lines are shared, a first one carrying a clock signal for synchronization, a second one for data communication from the master device (11) to a slave device (12) and a third one for data communication from a slave device to the master device (11).

The selection line (CS) may be an open-drain connection line between the master device (11) and the respective slave device (12).

No additional interrupt lines may be dedicated to management of interrupt requests from the slave devices (12) to the master device (11).

A method for interrupt management in a digital communication system (10) may be summarized as including a master device (11) and a number of slave devices (12) coupled in communication with the master device (11) over a shared data communication bus (13), wherein the digital communication system (10) includes a selection line (CS) for each one of the slave devices (12), coupling the master device (11) with a respective slave device (12) and dedicated to selection by the master device (11) of the respective slave device (12) for communication over the shared data communication bus (13), characterized by: sending, by each of the slave devices (12), an interrupt request (INT) to the master device (11) over the respective selection line (CS); and serving, by the master device (11), the interrupt request initiating a communication over the shared data communication bus (13), wherein each selection line (CS) is a bidirectional communication line between the respective slave device (12) and the master device (11).

The selection line (CS) may be in a first state when no communication occurs between the master device (11) and the respective slave device (12); including driving, by the slave device (12), the respective selection line (CS) into a second state, different from the first state, to communicate the interrupt request to the master device (11).

The method may include releasing, by the slave device (12), the selection line (CS), after a given time interval from driving it to the second state.

The given time interval may correspond to a number of periods of a synchronization signal carried by a clock line (SCK) of the shared data communication bus (13).

The method according may include, after the given time interval, checking, by the slave device (12), the state of the respective selection line (CS) and: implementing a data communication with the master device (11) in case the respective selection line (CS) is in the second state, being indicative of acknowledgement of the interrupt request by the master device (11), the master device (11) driving the selection line (CS) in the second state during the data communication; waiting for a future data communication with the master device (11) in case the respective selection line (CS) is in the first state, being indicative of not-acknowledgement of the interrupt request by the master device (11).

Sending, by each of the slave devices (12), an interrupt request (INT) may be in response to an internal event occurring at the slave device (12).

The method may include, by the slave device (11), checking the status of the respective selection line (CS) after the internal event and generating the interrupt request only in case the respective selection line (CS) is not already in the second state.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A digital communication system, comprising:
   a master device;
   a plurality of slave devices communicatively coupled with the master device over a shared data communication bus; and
   a plurality of selection lines which can be in a first state or a second state, each selection line of the plurality of selection lines coupling the master device with a respective slave device and dedicated to selection by the master device of the respective slave device for communication over the shared data communication bus,
   wherein each of the slave devices is configured to send an interrupt request to the master device over the respective selection line in response to an internal event occurring at the slave device, the master device being configured to serve the interrupt request by initiating a communication over the shared data communication bus, each of the slave devices is configured to check the status of the respective selection line after the internal event and generate the interrupt request only in case the respective selection line is not already in the second state, being indicative of an on-going communication with the master device, wherein each selection line is a bidirectional communication line between the respective slave device and the master device.

2. The system according to claim 1, wherein each respective selection line is in the first state when no communication occurs between the master device and the respective slave device, and wherein the respective slave device is configured to drive the respective selection line into the second state, different from the first state, to communicate the interrupt request to the master device.

3. The system according to claim 1, wherein communication on the shared data communication bus is according to a Serial Peripheral Interface (SPI) protocol and the shared data communication bus includes four data communication lines, of which three lines are shared, a first one carrying a clock signal for synchronization, a second one for data communication from the master device to a slave device and a third one for data communication from a slave device to the master device.

4. The system according to claim 1, wherein no additional interrupt lines are dedicated to management of interrupt requests from the slave devices to the master device.

5. The system according to claim 2, wherein the respective slave device is configured to release the respective selection line, after driving it to the second state, after a given time interval.

6. The system according to claim 5, wherein the shared data communication bus includes a clock line configured to carry a synchronization signal, and wherein the given time interval corresponds to a number of periods of the synchronization signal.

7. The system according to claim 5, wherein after the given time interval, the slave device is configured to check the state of the respective selection line and is further configured to:
   implement a data communication with the master device in case the respective selection line remains in the second state, being indicative of acknowledgement of the interrupt request by the master device, the master device being configured to drive the selection line in the second state during the data communication; and
   wait for a future data communication with the master device in case the respective selection line is in the first state, being indicative of not-acknowledgement of the interrupt request by the master device.

8. The system according to claim 3, wherein the selection line is an open-drain connection line between the master device and the respective slave device.

9. The system according to claim 6, wherein the number of periods is between two and eight.

10. The system according to claim 7 wherein the master device continues to drive the selection line in the second state until the data communication is complete.

11. A method for interrupt management in a digital communication system including a master device and a plurality of slave devices communicatively coupled with the master device over a shared data communication bus, wherein the digital communication system includes a respective selection line for each one of the slave devices, coupling the master device with a respective slave device and dedicated to selection by the master device of the respective slave device for communication over the shared data communication bus, each respective selection line is in a first state when no communication occurs between the master device and the respective slave device, the method comprising:
   sending, by each of the slave devices, an interrupt request to the master device over the respective selection line; and
   serving, by the master device, the interrupt request initiating a communication over the shared data communication bus, driving, by the respective slave device, the respective selection line into a second state, different from the first state, to communicate the interrupt request to the master device; and releasing, by the respective slave device, the respective selection line, after a given time interval from driving it to the second state, wherein each selection line is a bidirectional communication line between the respective slave device and the master device.

12. The method according to claim 11, wherein the given time interval corresponds to a number of periods of a synchronization signal carried by a clock line of the shared data communication bus.

13. The method according to claim 11, comprising:

after the given time interval, checking, by the respective slave device, the state of the respective selection line;

implementing a data communication with the master device in case the respective selection line is in the second state, being indicative of acknowledgement of the interrupt request by the master device, the master device driving the selection line in the second state during the data communication; and waiting for a future data communication with the master device in case the respective selection line is in the first state, being indicative of not-acknowledgement of the interrupt request by the master device.

14. The method according to claim 11, wherein sending, by each of the slave devices, an interrupt request is in response to an internal event occurring at the slave device.

15. The method according to claim 12, wherein the number of periods is between two and eight.

16. The method according to claim 13 wherein the master device driving the selection line in the second state continues until the data communication with the slave device is complete.

17. The method according to claim 14, comprising, by the slave device, checking the status of the respective selection line after the internal event and generating the interrupt request only in case the respective selection line is not already in the second state.

* * * * *